Feb. 21, 1956

A. N. MILSTER ET AL 2,735,589

PORTABLE DEVICE FOR FILLING HYDRAULIC
BRAKE SYSTEMS WITH BRAKE FLUID

Filed June 21, 1950

INVENTORS:
ARTHUR N. MILSTER,
RALPH W. SHARTLE,

By Carr & Carr & Gravely,
ATTORNEYS.

INVENTORS:
ARTHUR N. MILSTER
RALPH W. SHARTLE

By Carr & Carr & Gravely
ATTORNEYS.

United States Patent Office 2,735,589
Patented Feb. 21, 1956

2,735,589

PORTABLE DEVICE FOR FILLING HYDRAULIC BRAKE SYSTEMS WITH BRAKE FLUID

Arthur N. Milster, St. Louis, and Ralph W. Shartle, Richmond Heights, Mo., assignors to Wagner Electric Corporation, St. Louis, Mo., a corporation of Delaware Application June 21, 1950, Serial No. 169,322

6 Claims. (Cl. 222—386.5)

This invention relates to mechanism for filling the fluid containing members of a hydraulic brake system with brake fluid, and is more particularly directed to a hydropneumatic mechanism having brake fluid under pressure therein to be transferred to the brake system and to be used in bleeding brake fluid therefrom.

One of the objects of the invention is to provide a device for filling the fluid containing members of a hydraulic brake system with brake fluid while preventing the entry of air and other foreign matter therein.

Another object of the invention is to provide a hydropneumatic device that will rapidly supply liquid under pressure to a hydraulic system without allowing said liquid to become contaminated by compressed air or other foreign matter coming into contact therewith either before or during the bleeding and filling operation.

A further object of the invention is to provide a device that will allow an accessible release for foreign matter accumulated in a compressed air chamber used in connection with this device.

A still further object of the invention is to provide a device that can be easily assembled and disassembled for shipping and for repair.

Another object of the invention is to provide a device for filling the fluid containing members of a hydraulic brake system with brake fluid under pressure, which mechanism provides means for releasing air and other foreign matter therefrom without loss of brake fluid.

A further object of the invention is to provide mechanism for filling the fluid containing members of a hydraulic brake system with brake fluid under pressure that is easily assembled and disassembled and that may be easily transported and not tip while being moved from one location to another.

Another object is to provide, as an integral part of the device, a caster equipped frame portion so the device may be easily moved and which is designed for easily accessible storage of adapters necessary for the universal application of the dispenser to all types and makes of hydraulic systems.

Yet a further object of the invention is to provide a pressure retaining seal between two formed metal surfaces by placing a resilient material between the surfaces and a retainer ring around the edges of said surfaces so formed that upon closing the ring, pressure is exerted on opposite faces of the resilient material.

The invention consists in the provision of a divided spherical housing having a diaphragm disposed therebetween dividing the housing into two chambers, one for brake fluid and the other for compressed air, there being means in the air chamber for supporting the diaphragm when no air pressure is applied thereto.

The invention also consists in the provision of means for preventing the entry of air into the hydrauilc brake system while being filled with brake fluid, the bleeding of air from the brake fluid chamber, and the deflation and draining of foreign matter from the air chamber.

The invention further consists in the provision of supporting means for the housing that are detachably secured to the clamping means for the housing and to a tool carrying means for holding the supporting means rigid, there being casters in the supporting means for transporting the housing with means mounted on the supporting means for holding the hose secured to the filler plug opening of the master cylinder of the hydraulic brake system.

The invention still further consists in the provision of mechanism for sealing the pressure retaining members together with a simple sealing ring and clamp.

In the drawings:

Fig. 3 is a detail view of a joint employed in the structure,

Figure 2:
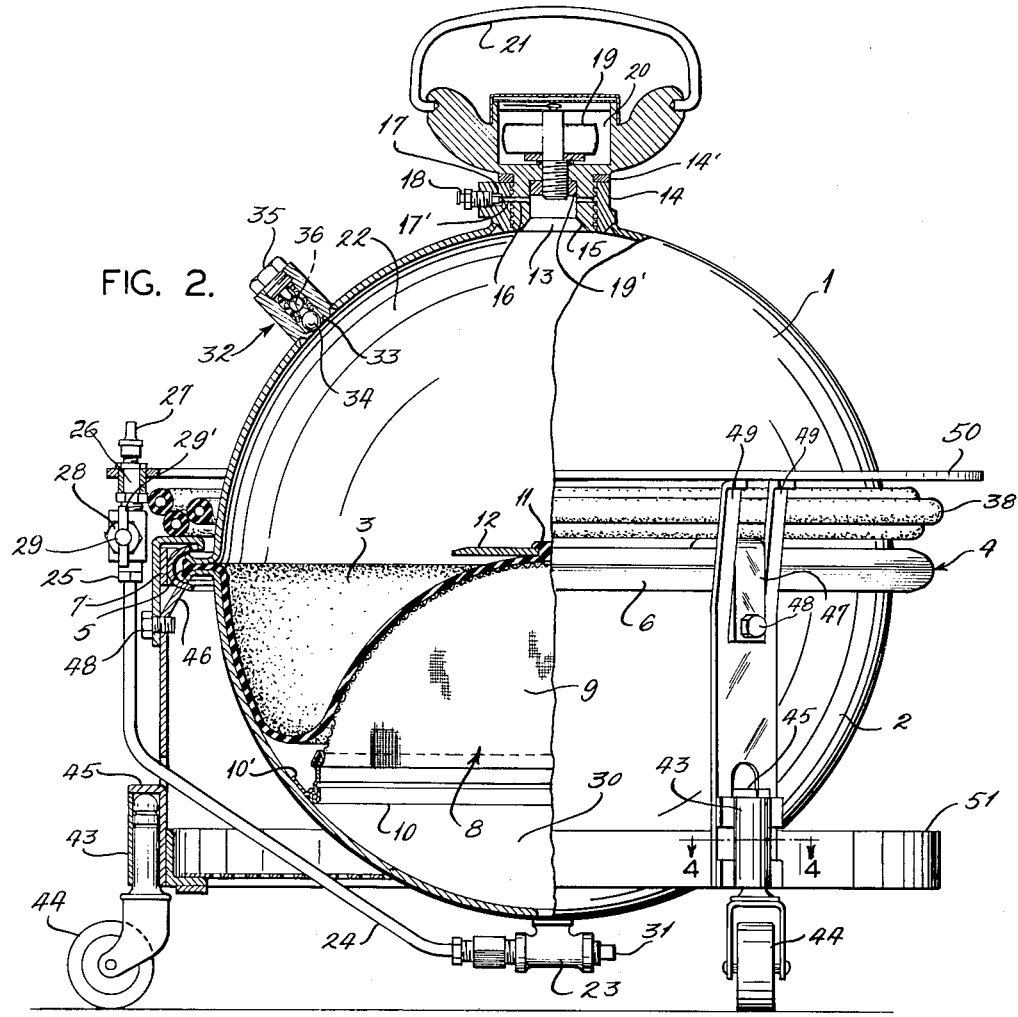
Fig. 2 is a sectional view of the structure shown in Fig. 1.
Figure 6:
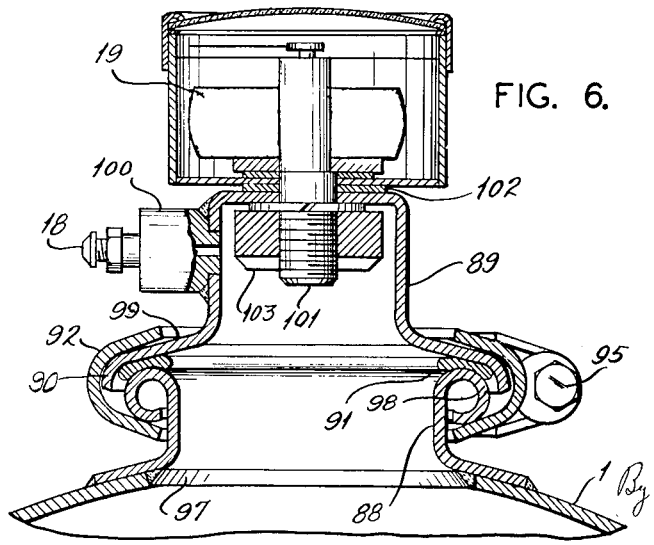
Figure 5:
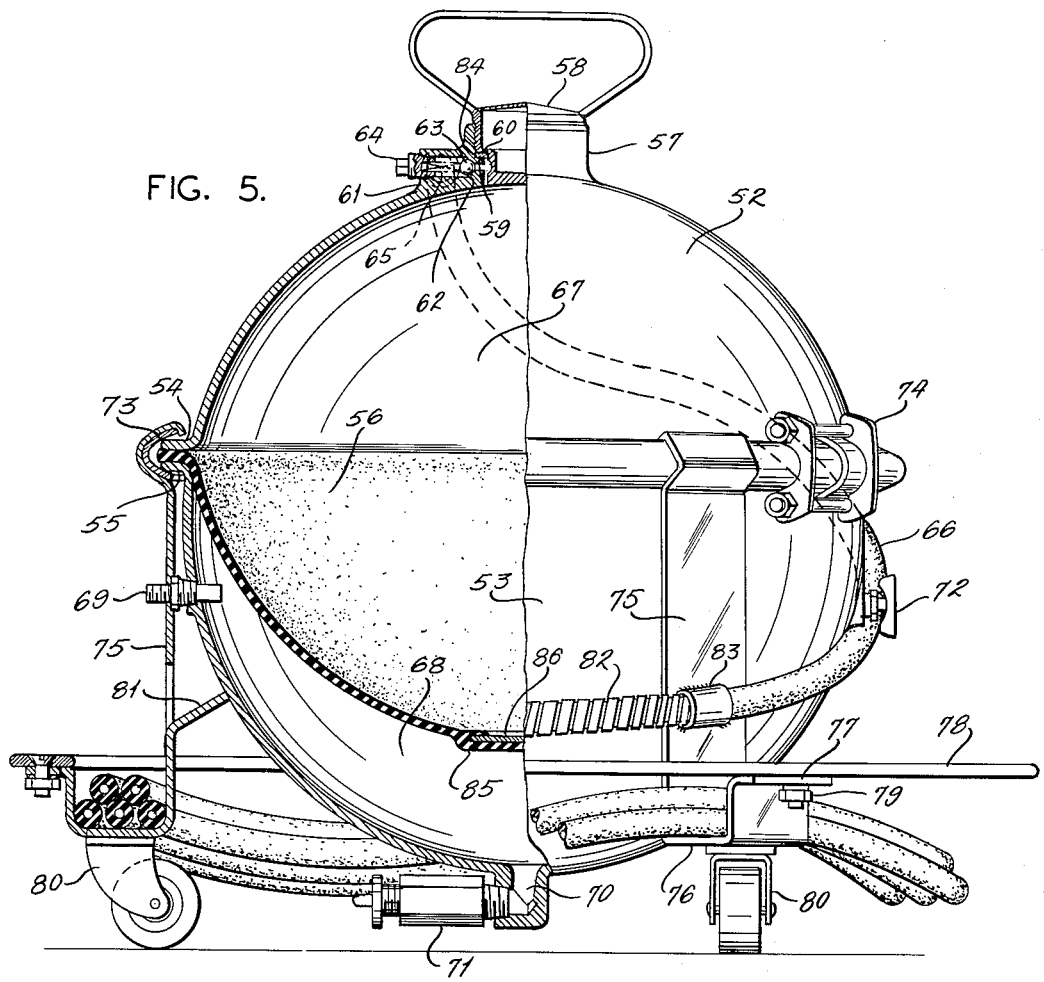
Figure 7:
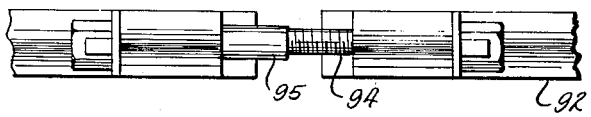
Figure 8:
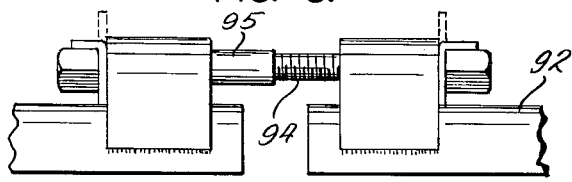

Fig. 4 is a sectional view taken substantially along the line 4—4 of Fig. 2, parts being omitted, Fig. 5 is a sectional view partly in section of a modified form of the invention, Fig. 6 is an elevational view partly in section of a second modification of the invention, Fig. 7 is a plan view of the means for securing the ends of the ring in the Fig. 6 modification; and Fig. 8 is a side elevation of the securing means shown in Fig. 6.

The invention is embodied in the container structure set forth in the several views of the drawings in which the numeral 1 indicates a hemispherical shell to which another hemispherical shell 2 is secured. A diaphragm 3 is disposed between the shells which are secured together by clamping means 4. A peripheral bead 5 is so positioned on the diaphragm that it will constitute a seal between the hemispherical members as well as means for correctly locating the diaphragm. The clamping means 4 consists of a ring 6 disposed about the flanged equatorial portions of the hemispherical shells that is held by a clamp 7 (Fig. 3). A diaphragm supporting member 8 is placed inside of shell 2 and is made up in the form of a segment of a sphere, the spherical segment being made from a wire cloth 9. A reinforcing frame or ring 10 supports the wire cloth and holds it in position. A series of clamps 10' is welded in the hemispherical shell 2 for holding the ring 10 in position. The diaphragm has an area greater than the equatorial area of the hemispherical shells. By reason of its larger area, the diaphragm will rest on the supporting member 8. The diaphragm is provided with a protruding portion 11 suitably grooved for receiving a protector plate 12, the function of which will be hereinafter described.

The hemispherical shell 1 is provided with an aperture 13 in which a filler bushing 14 is secured. A plug 15 is threaded into the filler bushing and is provided with a passageway 16 communicating with an internal groove 17' machined in the threaded portion of the bushing in a position to communicate with bore 17 in the filler bushing. A bleeder valve 18 is threaded into the bore 17 so that any air entrapped in the hemispherical shell 1 may be released through the bleeder valve after the device has been sealed and pressure applied, as will be explained later. The plug 15 is suitably bored in order that pressure gauge 19 may be threaded therein. The gauge 19 is received in a bore 20 in plug 15. A handle 21 is pivoted to the plug and suitable gaskets 14' and 19' are provided for preventing leakage of brake fluid from chamber 22 formed in the hemispherical shell 1 above the diaphragm 3.

A T-fitting 23 is attached to the hemispherical shell 2 and a tube 24 connected thereto. The tube is also connected to a fitting 25 having a standard air inlet valve assembly 26 threaded therein, similar to that used on automobile tires, the assembly being provided with a valve cap 27. A sleeve 28 is secured to the fitting 25, which sleeve is provided with notches 25' diametrically across the end thereof to allow the valve handle 29' to rest therein. A valve 29 provided with a handle 29' is slidably mounted in the sleeve. The interior of the sleeve communicates with tube 24, and valve 29 biased by spring 25" functions as a slow relief for normal pressures and may also be used as a blow-off valve for the air chamber 30 in hemispherical shell 2. The T-fitting 23 is provided with a drain plug 31 for releasing any foreign matter that might gather in chamber 30. Air under pressure is supplied to chamber 30 through the air inlet valve assembly 26 in the conventional manner. Brake fluid fills the chamber 22 and when compressed air is applied to the lower side of the diaphragm 3, the brake fluid in chamber 22 is in condition to be forced therefrom.

A fitting 32 is welded to the hemispherical shell 1 at a point substantially midway between the equatorial flange and plug 15. This fitting has a valve seat 33 therein with which a ball valve 34 cooperates. A plug 35 is threaded into fitting 32 and a spring 36 is interposed between the plug and valve 34. The plug may have a stem thereon for holding the spring in position. The valve prevents return of fluid from the hose and entry of air therein if the dispenser is opened for refilling during its operation. It also makes an audible sound as fluid passes therethrough, thus signalling the operator of that fact. A hose fitting 37 is threaded into fitting 32, and a hose 38 is secured to the hose fitting 37. A needle valve 39 is connected to hose 38, and a short length of hose 40 is provided with an adapter 41 and connected to the needle valve 39. The adapter 41 is applied to the filling vent of the master cylinder in the hydraulic brake system (not shown) to be filled.

The assembly is supported on a tripod mechanism consisting of three legs 42 made from a length of strap metal to the lower end of which is secured a caster stem holder 43. A caster 44 is inserted in the holder 43. A portion 45 is struck from each of the legs 42 and bent over the upper end of the caster holder. The upper ends of each of the legs 42 are slit for forming a tongue 46 bent inwardly and cut to such a length that the free end thereof is in engagement with the closing ring 6. A bracket 47 is secured to each of the legs 42 by means of a screw 48 and is in engagement with the upper radial surface of the clamping ring 6. Integral forks 49 on the upper ends of legs 42 support retainer ring 50 that also supports the air inlet valve assembly 26. The hose 38 is received in the space provided between forks 49 and shell 1. A circular tool holding basket 51 is disposed about the lower portion of the hemispherical shell 2 and secured to the lower ends of legs 42, thereby stiffening the latter and permitting the assembly to move about the floor without danger of tipping or collapsing.

Figure 1:
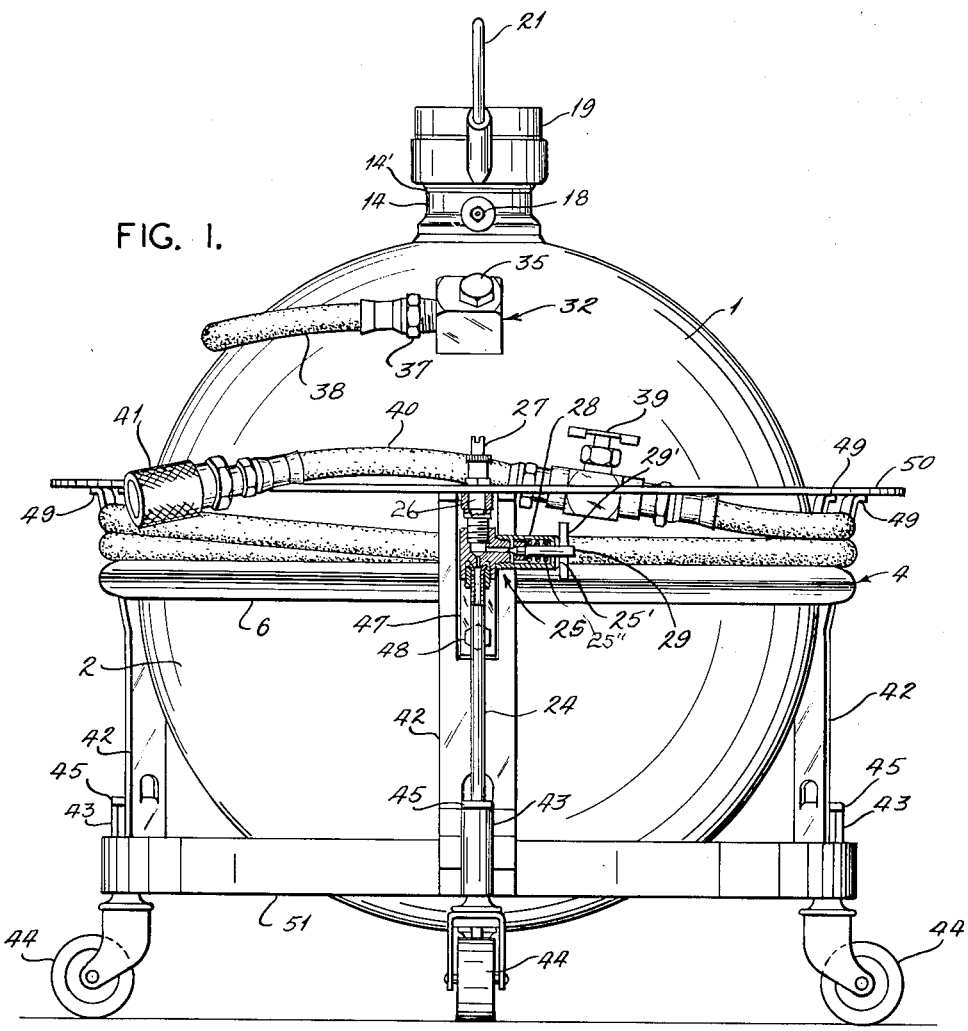
Fig. 1 is a side elevational view of the structure embodying the invention.

Assuming the fluid container assembled as shown in Fig. 1, the valve 29 is manually pulled to the right against the force of spring 25" and the valve stem rotated 90° to place the valve handle in a horizontal position. This action opens the valve and locks it open for allowing air under pressure that might prevent the diaphragm 3 resting on the cloth screen 8, to be expelled therethrough. The filler plug 15 is then unscrewed from the filler bushing 14 and brake fluid poured into the brake fluid chamber 22 on the upper side of diaphragm 3 through bushing 14. After filling, the gasket 14' is checked and replaced if it had been removed during the filling operation, and the plug 15 replaced by screwing it down tightly against the gasket. The valve 29 is then closed by rotating the stem until the handle 29' drops into the notch 25'. The valve cap 27 is then removed from the air inlet valve assembly 26 and a standard air hose (not shown) is connected to said valve for admitting air under pressure to the volume below the diaphragm 3 which will supply the necessary pressure for operation of the device. The gauge 19 will indicate the relative amount of air under pressure being admitted to the volume below the diaphragm 3. As a precaution, to prevent damage to the fluid retainer and possibly injury to the operator, the relief valve 29 will release air under pressure through the port controlled thereby to atmosphere when the pressure exceeds a predetermined value, or until said pressure drops below the value at which the relief valve operates. The bleeder screw 18 (Fig. 2) is loosened when necessary for the purpose of allowing release of entrapped air in the brake fluid compartment after filling, or may be used to remove excess brake fluid when plug 15 is being replaced. The valve cap 27 is then replaced, as shown in Fig. 2, for the purpose of preventing foreign matter entering the valve 26 after the air hose has been removed.

After the fluid container has been serviced as above, the free end of hose 38 and the attached coupling assembly constituting a needle valve 39, the hose 40 and adapter 41 (Fig. 1) is connected to the master cylinder reservoir of the braking system of the vehicle or apparatus to be serviced. When the needle valve 39 is subsequently opened, brake fluid will pass from chamber 22 above diaphragm 3 past the valve 34, the pressurized fluid moving it against the force of the valve spring 36 and passing through the hose fitting 32 into hose 38, through valve 39 into hose 40, adapter 41, and finally into the fluid system of the vehicle. The needle valve 39 is utilized to remove pressure from the automatic valve (not shown) located in adapter 41. It is utilized to allow the adapter previously attached to the brake system to be serviced without waste of fluid and to also keep the brake system at zero pressure until the operator desires to have pressure applied thereto. The ball valve 34 prevents fluid in the hose 38 returning to the fluid space 22 when the pressure therein is lowered. As brake fluid is discharged from the device, the diaphragm 3 moves upwardly until the protector plate 12 contacts the upper inner surface of shell 1. In this instance the protector plate 12 prevents the diaphragm 3 extruding into passages 13 and 16, which action would shorten the life of the diaphragm considerably. The protector plate also prevents the diaphragm being blown out through passage 13 if plug 15 is removed before pressure fluid below the diaphragm is released.

When the volume of brake fluid in the retainer has decreased to the extent that diaphragm 3 covers the fluid outlet opening at valve 33, cutting off a further flow of brake fluid, the pressure fluid below diaphragm 3 is released by opening valve 29, as described above, thus allowing the air under pressure to pass from the chamber 30 below the diaphragm through T-23, tube asembly 24, valve 29 and outlets therein. The release of pressure fluid will permit diaphragm 3 to return to the position shown in Fig. 2, coming to rest on the wire cloth 9 after plug 15 is removed for eliminating the vacuum condition that is created in the brake fluid compartment. The wire cloth 9 limits the volume of brake fluid that may be placed in the fluid container so as to create the desired condition of having as much space as possible for brake fluid, and at the same time providing a sufficient volume for air under pressure to maintain a minimum pressure change when the fluid container is placed in use while disconnected from the air supply. The greater the volume of air under pressure, the less pressure change will occur during use of the fluid container. Before refilling the retainer, plug 31 may be removed to allow expulsion of water and other foreign matter that might have settled from the air under pressure admitted below the diaphragm 3.

A modified form of the invention is illustrated in Fig. 5 in which the container is made up of sphere segments 52 and 53. These segments are of different size and are provided with flanges 54 and 55 between which the peripheral edge of a flexible diaphragm 56 is located. The sphere segment 52 has a bushing 57 secured thereto into which a plug 58 is threaded. The bushing is provided with a seat 59 on which a gasket 60 is placed for forming a seal between a shoulder on plug 58 and the seat 59. A boss 61 is formed on the bushing 57 having a valve seat 62 therein with which a ball valve 63 cooperates. A plug 64 is threaded into the boss and a spring 65 is interposed between the ball valve 63 and plug 64. The boss is provided with an outlet (not shown) to which a hose 66 is connected.

The diaphragm 56 divides the container into chambers 67 and 68, the former being filled with brake fluid and the latter having compressed air supplied thereto through an air inlet valve fitting 69. The sphere segment 53 is provided with a sump 70 to which a blow-off valve 71 is connected; and a drain valve 72 is threaded into this sphere segment 53 below diaphragm 56. The sphere segments 52 and 53 are clamped together along the peripheral edge of the diaphragm by a clamping ring 73 tensioned by a clamping member 74, the degree of clamping applied thereto determining the tightness of the seal between diaphragm 56 and the flanges 54 and 55.

The container is supported on a tripod mechanism consisting of legs 75, each of which has one end thereof shaped for embracing the clamping ring 73. The other ends of the legs are bent to form channels 76 and a flange 77 is bent outwardly from the channels. A ring 78 is secured to each of the flanges 77 by fastening means 79. A caster 80 is secured to the lower side of each channel member so that the container may be freely moved. The tripod supporting structure circumscribes the container and, therefore, is of such proportions as to prevent tipping of the container. Each of the legs 75 has a portion 81 struck therefrom that engages with the sphere segment 53, thus stiffening each of the legs and preventing relative movement with respect to the container. These legs are resilient in character and so proportioned that the part embracing the clamping ring 73 will be urged toward the container and downwardly about said ring.

The hose 66 is clipped to one of the legs 75. A portion of the hose is surrounded by a spring 82, one end of which is secured to the hose clip 83 fastened to one of the legs 75. The hose 66 is laid in the channels 76 when not in use. The end of the hose to be secured to the master cylinder is provided with a fitting similar to the parts 39, 40 and 41 above described.

Before chamber 67 is filled with brake fluid, the air in chamber 68 is drained therefrom through valve 72. The chamber 67 is now filled with fluid and plug 58 is threaded into the bushing 57. The excess fluid in chamber 67 is forced therefrom through a vent 84 cut in the bushing 57 and compressed air is introduced into chamber 68 through the air inlet valve fitting 69. When the fluid is drained from chamber 67 through hose 66 and almost entirely removed therefrom, a bead 85 formed on diaphragm 56 engages with the inner surface of the sphere segment 52. A reinforcing plate 86 is fitted into the diaphragm within the bead. The blow-off valve 71 regulates the maximum pressure to be applied to the diaphragm 56 and also constitutes means for removing condensations and other foreign matter that might gather in the sump 70.

Another modification of this invention is shown in Figs. 6, 7 and 8. Fig. 6 shows a filling bushing and plug that replaces similar structure shown in Figs. 1 and 2. The function and operation of the spherical device is identical thereto. It differs from those previously described in detail in that the filler bushing 15 of Fig. 1 is replaced by an opening 97 formed in shell 1. This opening 97 has welded thereover a flange 88 with its edge drawn from the metal of the flange rolled, as shown at 98, to present a smooth surface to the gasket 91 of resilient material. The cap 89 has a portion 99 surrounded by a flange 90 which contacts gasket 91. A closing ring 92 substantially V-shaped in cross section, surrounds the cap 89 and the rolled edge 98 of flange 88 contacts substantially the entire periphery of both the cap and the rolled edge. When drawn tight by the draw-bolt 94 and draw nut 95, this ring causes the resilient gasket to be clamped securely between the cap and the rolled edge to produce a pressure tight seal therebetween.

The cap 89 is provided with a bushing 100 drilled and tapped to accommodate the bleeder screw 18 which is provided to release entrapped air in the liquid filled portion of the device after filling. Also mounted on the cap is the pressure gauge 19 whose stem 101 projects through the cap and is secured in pressure tight relation thereto by the gasket 102 and nut 103.

To fill this device with fluid it is merely necessary to release the entrapped pressure by means of valve 29 (Fig. 1) which allows the diaphragm 3 to drop to its normal position against the screen 8 after the bleeder screw 18 is backed off its seat to admit air to the fluid containing chamber 22. The draw-bolt 94 and draw-nut 95 are then loosened so that the closing ring 92 can be expanded sufficiently for the cap 89 to be removed.

After filling the space 22 with fluid, the cap 89 is replaced and the closing ring 92 positioned therearound, after which the draw-bolt 94 and draw-nut 95 are tightened to produce the necessary seal. Gas under pressure is then admitted to the space 30 below the diaphragm 3, thus raising said diaphragm until all air is driven from the liquid filled portion of the device, after which the bleeder screw 18 is tightened and the required pressure, as indicated by the gauge 19, is built up in the device. In other respects this modification operates as previously described.

What we claim is:

1. A liquid dispenser comprising a vessel including upper and lower hemispherical members having opposed edge flanges, a flexible diaphragm partitioning the vessel into two chambers and secured about its periphery between said flanges, means clamping said flanges and diaphragm periphery together, means for introducing gas into the lower member below the diaphragm, means for introducing liquid into the upper member above the diaphragm, hose means for discharging liquid from the upper member, a support for the vessel comprising upright leg members each extending at its upper end across the flange clamping means, means at the upper end of each leg member forming a locking connection with said flange clamping means, an annular member encircling the vessel, means for securing the annular member to said legs, and means between the annular member and the vessel forming a carrier for the hose when coiled around the vessel.

2. The invention according to claim 1, wherein the means forming said locking connection comprises a tongue carried by each leg and extending upward and inwardly beneath and engaging the clamping means and the bracket secured to each leg and extending in above the adjacent tongue and engaging the top of the clamping means.

3. The invention according to claim 1, wherein said means securing the annular member to the legs comprises upwardly and outwardly extending forks carried by the upper ends of the legs and said annular member resting upon and being secured to the said forks.

4. The invention according to claim 1, wherein said legs are in the form of flat bars, and an elongate member struck from each of said flat leg bars below the connection with said locking means and extending upwardly and inwardly into stabilizing engagement with the said lower hemispherical member.

5. The invention according to claim 1, wherein said annular member is disposed in a plane below the upper ends of the legs and lies outside of the legs and the means forming the carrier comprises an outwardly extending portion of the lower end of each leg and a vertical continuation of each portion spaced from the leg and said annular member being secured to the said vertical continuations of the outwardly extending portions of the legs.

6. A pressure reservoir for hydraulic fluid comprising a sealed hollow body member symmetrical about at least one plane passed therethrough, a flexible diaphragm having its periphery lying substantially in said one plane and secured thereat to said body member to provide a hydraulic fluid receiving chamber on one side of the diaphragm, said diaphragm being of great enough area as to contact the inner surface of said body member defining said hydraulic fluid receiving reservoir throughout substantially the entire area thereof while the diaphragm remains in unstretched condition, a foraminous diaphragm-supporting member secured within said body member on the opposite side of said diaphragm, said foraminous member being of sufficient area as to define with an inner surface portion of the hollow body an air chamber of large enough volume so that entrapped air under pressure therein may expand to the full volume of said hollow body member and expel all of the hydraulic fluid from within its chamber, hydraulic fluid outlet means communicating with the hydraulic fluid chamber, and air inlet means communicating with the air chamber.

References Cited in the file of this patent

UNITED STATES PATENTS

| | | |
|---|---|---|
| 1,047,452 | Schottgen | Dec. 17, 1912 |
| 1,632,559 | Pedrick | June 14, 1927 |
| 1,743,056 | Whitaker | Jan. 7, 1930 |
| 1,892,519 | Schottgen | Dec. 27, 1932 |
| 1,911,094 | Skoglund | May 23, 1933 |
| 2,097,985 | Maryott | Nov. 2, 1937 |
| 2,145,613 | Shenk | Jan. 31, 1939 |
| 2,162,096 | Marmorek | June 13, 1939 |
| 2,509,570 | Lee | May 30, 1950 |